US010641408B2

(12) United States Patent
Sigg et al.

(10) Patent No.: US 10,641,408 B2
(45) Date of Patent: May 5, 2020

(54) ELECTRICALLY CONTROLLED VALVE FOR HOT FLUID

(71) Applicant: MMT SA, Zug (CH)

(72) Inventors: Daniel Sigg, Sonceboz-sombeval (CH); Philip Graf, Sonceboz-sombeval (CH)

(73) Assignee: MMT SA, Zug (CH)

( * ) Notice: Subject to any disclaimer, the term of this patent is extended or adjusted under 35 U.S.C. 154(b) by 118 days.

(21) Appl. No.: 15/548,610

(22) PCT Filed: Feb. 4, 2016

(86) PCT No.: PCT/EP2016/052442
§ 371 (c)(1),
(2) Date: Aug. 3, 2017

(87) PCT Pub. No.: WO2016/124720
PCT Pub. Date: Aug. 11, 2016

(65) Prior Publication Data
US 2017/0370493 A1 Dec. 28, 2017

(30) Foreign Application Priority Data

Feb. 4, 2015 (FR) ...................................... 15 50882

(51) Int. Cl.
*F16K 31/04* (2006.01)
*F16K 27/02* (2006.01)
(Continued)

(52) U.S. Cl.
CPC .......... *F16K 31/043* (2013.01); *F02D 9/1065* (2013.01); *F02D 41/0077* (2013.01);
(Continued)

(58) Field of Classification Search
CPC ...... F02D 9/1065; F02M 26/54; F02M 26/58; F02M 26/67; F02M 26/70; F02M 26/74;
(Continued)

(56) References Cited

U.S. PATENT DOCUMENTS

RE30,135 E * 11/1979 Fitzwater ................ F16K 17/36
251/66
5,374,028 A 12/1994 Neubold
(Continued)

FOREIGN PATENT DOCUMENTS

CH 579713 A5 9/1976
DE 10344218 A1 4/2005

OTHER PUBLICATIONS

Google Translation and Wikipedia entry for "air blade" dated May 28, 2019, https://translate.google.com/translate?hl=EN&sl=fr&u=https://fr.wikipeida.org/wiki/Lame_d%2527air&prev=search, 1 page.

*Primary Examiner* — Seth W. Mackay-Smith
(74) *Attorney, Agent, or Firm* — Harness, Dickey & Pierce, PLC

(57) ABSTRACT

An electrically controlled valve for the circulation of hot fluids is made up of an electromagnetic actuator and a valve. The valve has an opening provided with a movable sealing member driven by a rotation shaft perpendicular to the axis of the opening, the electromagnetic actuator driving the rotation of the shaft, the output shaft of the actuator being substantially coaxial with the rotation shaft. The front end of the rotation shaft and the front end of the output shaft are not in direct contact. The coupling between the rotation shaft of the valve and the output shaft of the actuator is provided by a coupling member placed between the front end of the output shaft and the front end of the shaft. The coupling member transmitting rotation torque with a misalignment tolerance between the output shaft and the rotation shaft of the valve. The valve also having thermally insulation for mechanical connection between peripheral areas of the body of the actuator and the body of the valve.

19 Claims, 6 Drawing Sheets

(51) Int. Cl.
*F02M 26/53* (2016.01)
*F02M 26/70* (2016.01)
*F02D 9/10* (2006.01)
*F02D 41/00* (2006.01)
*F02M 26/67* (2016.01)
*F02M 26/74* (2016.01)

(52) U.S. Cl.
CPC ............ *F02M 26/53* (2016.02); *F02M 26/67* (2016.02); *F02M 26/70* (2016.02); *F02M 26/74* (2016.02); *F16K 27/029* (2013.01)

(58) Field of Classification Search
CPC ............ F16K 27/0218; F16K 27/0245; F16K 27/0272; F16K 27/029; F16K 31/043; F16K 31/528; F16K 31/5282
USPC .................................................. 251/129.11
See application file for complete search history.

(56) References Cited

U.S. PATENT DOCUMENTS

| | | | |
|---|---|---|---|
| 5,460,146 A * | 10/1995 | Frankenberg | F02M 26/53 123/568.21 |
| 6,079,210 A * | 6/2000 | Pintauro | F02B 37/183 123/568.21 |
| 6,299,130 B1 * | 10/2001 | Yew | F16K 31/06 251/129.15 |
| 6,598,619 B2 | 7/2003 | Gagnon | |
| 7,740,228 B2 * | 6/2010 | Simpson | F16K 31/045 251/305 |
| 8,146,886 B2 * | 4/2012 | Hanlon | F16K 31/047 251/129.11 |
| 8,187,106 B2 * | 5/2012 | Muenich | F02D 9/1065 464/105 |
| 8,480,054 B2 | 7/2013 | Pintauro | |
| 8,931,759 B2 * | 1/2015 | Bonanno | F16K 31/041 251/129.11 |
| 9,022,351 B2 * | 5/2015 | Zlindra | F16K 49/005 123/337 |
| 10,260,429 B2 * | 4/2019 | Kaufmann | F02D 9/08 |
| 2001/0035510 A1 * | 11/2001 | Oh | F16K 31/535 251/129.03 |
| 2002/0092510 A1 * | 7/2002 | Sari | F02M 26/54 123/568.2 |
| 2002/0148512 A1 * | 10/2002 | Laney | F16K 1/221 137/601.11 |
| 2002/0175306 A1 * | 11/2002 | Gomi | F16K 1/221 251/292 |
| 2003/0178596 A1 * | 9/2003 | Gomi | F16K 1/221 251/305 |
| 2004/0119041 A1 * | 6/2004 | Kawai | F02D 9/1035 251/305 |
| 2004/0129906 A1 | 7/2004 | Authelet et al. | |
| 2004/0173184 A1 * | 9/2004 | Tanimura | F02D 9/1065 123/399 |
| 2004/0262556 A1 * | 12/2004 | Everingham | F16K 31/047 251/129.11 |
| 2005/0012061 A1 * | 1/2005 | Faye | F16K 5/0235 251/129.11 |
| 2005/0199847 A1 * | 9/2005 | Hatano | F16K 1/36 251/129.15 |
| 2007/0205386 A1 * | 9/2007 | McDowall | B64D 13/02 251/305 |
| 2010/0031938 A1 * | 2/2010 | Lim | F02M 26/16 123/568.17 |
| 2010/0144452 A1 * | 6/2010 | Muenich | F16D 3/04 464/105 |
| 2012/0068099 A1 * | 3/2012 | Sealy | F16K 31/055 251/291 |
| 2015/0159770 A1 | 6/2015 | Foucaut et al. | |
| 2018/0051611 A1 * | 2/2018 | Hwang | F01N 1/18 |

* cited by examiner

ELECTRICALLY CONTROLLED VALVE FOR HOT FLUID

CROSS-REFERENCE TO RELATED APPLICATIONS

This application is a National Phase Entry of International Application No. PCT/EP2016/052442, filed on Feb. 4, 2016, which claims priority to French Patent Application Serial No. 1550882, filed on Feb. 4, 2015, both of which are incorporated by reference herein.

TECHNICAL FIELD

The present invention relates to the field of electromagnetic valves for hot fluids. It relates more particularly to the valves for automotive applications, in particular exhaust gas recirculation valves. It is however not limited to automotive applications and relates more generally to valves for controlling the circulation of gaseous or possibly liquid fluids, at high temperatures, typically above 200° C., and possibly reaching, for exhaust gases, 700° C.

BACKGROUND

A first family of solutions is known from the prior art in which the link between the control shaft of the blanking member of the valve, and the actuator, is made via levers making it possible to create a thermal insulation by the distance between the valve subjected to very high temperatures, and the actuator whose temperature must remain moderate. These solutions present many drawbacks. They involve the use of numerous mechanical parts to ensure the transmission. These parts are subjected to high temperatures, leading to expansions that are difficult to control. They are also reflected by accelerated wear, resulting from the radial loads exerted on the transmission elements. The application EP2044354 presents an exemplary embodiment.

A second family of solutions provides a direct mechanical link between the blanking member and the output shaft of the actuator, and cooling means making it possible to keep the temperature of the actuator in conditions compatible with the constraints of the electronic and electromechanical components. By contrast, these solutions avoid the drawbacks stated for the first family of solutions.

The solutions of the prior art, in particular those providing a direct mechanical link between the blanking member and the actuator, present a drawback linked to the discrepancy constraints on both mechanical and thermal levels. On this account, the patent application WO2012038351 describes a butterfly valve driven by a gear motor.

To ensure a satisfactory mechanical coupling, making it possible to transmit the rotation torque without play, and reliably, an axis common to the actuator and to the blanking member is used, or two axes aligned and fitted together, for example coupled by a rigid link, for example splined shafts, are used. The consequence is a high thermal transmission, and the transfer of the heat from the valve to the actuator. To compensate for this effect, it has been sought in the prior art to cool a part of the actuator, for example by a cooling circuit.

Many prior art solutions aim to increase the transmission of heat coming from the valve to cooled areas of the actuator, which make it possible to discharge the heat. These solutions lead to unsatisfactory compromises: in effect, the valve is designed to operate at high nominal temperatures, and the thermal link with cooled areas is of little interest, inasmuch as the fluid circulates at its nominal temperature. They also lead to high thermal gradients, in a relatively small space, between the hot fluid and the cooling circuit.

In order to reconcile an effective mechanical link with a thermal insulation, a valve has been proposed in the prior art, described in U.S. patent Publication No. application US 2008017816. This patent describes an exhaust valve comprises a valve body, a valve supported by a shaft inside the valve body, and an actuator which drives the shaft to displace the valve relative to the valve body.

U.S. Pat. No. 8,480,054 describes another known solution for coupling a torsionally and thermally insulating rigid shaft, with multiple degrees of freedom to allow misalignment. The coupling device makes it possible to reduce the transfer of heat and isolation from vibrations between the actuator and the valve. The coupling device generally comprises a coupling shaft coupled in rotation at its opposing ends to the input and output shafts by torsion spring mechanisms. The torsion spring mechanisms comprise stirrups blocking rotation of the shaft coupling the input and output shafts. The torsion spring mechanisms allow a limited range of axial displacement and of pivoting between the coupling shaft and the input and output shafts and are preloaded to avoid the valve rotation hysteresis.

U.S. Pat. No. 6,598,619 also describes a valve which comprises a closure element, a motive force device, a coupling element, and a spacing element. The body defines a flow passage which is arranged along a longitudinal axis. The closure element is arranged in the flow passage and comprises a first shaft which is prolonged along a first axis which is oblique relative to the longitudinal axis. The closure element can rotate on the first axis between a first position which substantially prevents the flow through the flow passage and a second position which generally allows flow through the flow passage.

The motor rotates the closure element between the first position and the second position, and comprises a second shaft which can rotate on a second axis. The coupling element linking the first and second shafts to transmit the rotation from the device to the closure element. The coupling element is elastic relative to the first and second shafts. The spacing element isolates the device relative to the wall, and generally defines a volume which contains the coupling element.

Also known is PCT patent Publication No. WO2013/021133 describing a dosing device comprising a valve body provided with a check valve adapted to be displaced between a closure position and an opening position, and a transmission axis having a first end linked to the check valve and a second end linked to a cam element, a rotary electrical actuator comprising a stator assembly and a rotor assembly that rotates about a rotation axis. The rotor assembly comprises a magnetic yoke bearing a rotor magnet and also a roller fixed onto the magnetic yoke off-center relative to the rotation axis and movable in the cam element so as to transform the rotary movement of the rotor assembly into a movement of the transmission axis. Also known is the German patent application DE10344218 or EO1431638 describing other solutions of the prior art.

The drawbacks of these known solutions is that the thermal transmission is indeed reduced at the level of the axes, but remain through the links between the body of the actuator and the body of the valve. These two parts are linked by bolts and by adjacent surfaces ensuring a thermal coupling.

If, on the contrary, the valve and the actuator are separated, the problem is that of the bulk of the assembly. To allow a good integration in a vehicle, it is necessary for the valve to be compact and not to have two distinct parts separated from one another. A person skilled in the art is therefore faced with a dilemma: addressing the thermal constraint means separating the valve in which the hot gases circulate from the electromagnetic actuator. But, addressing the compactness constraint means, on the contrary, bringing these two parts together.

SUMMARY

The invention aims to solve these problems by taking the opposite view to the prior art solutions. It does not aim to manage the thermal conduction between the valve and the hot gas circuit, and a cooled area linked rigidly, but to dissociate these two areas while preserving an effective and robust mechanical coupling, with compactness. It thus makes it possible to optimize the design of the valve on the one hand, and of the actuator part on the other hand. The valve is designed to operate at high temperatures, without seeking to cool it or even to absolutely prevent leaks of hot fluids.

The actuator, for its part, is designed to operate at a nominal temperature compatible with its electronic, magnetic and electrical components, without it being necessary to organize the transmission of the calories coming from the thermal coupling with the valve by a common axis. One of the main aims of the invention is to reconcile the thermal decoupling, the robustness of the torque transmission and the compactness of the assembly formed by the actuator and the valve.

To this end, the invention relates, according to its most general sense, to an electrically-controlled valve for circulating hot fluids consisting of an electromagnetic actuator and a valve, said valve having an orifice provided with a movable blanking member driven by a rotation shaft at right angles to the axis of said orifice, said electromagnetic actuator driving the rotation of said shaft, the output axis of said actuator being substantially coaxial with said rotation shaft, characterized in that the front end of the rotation shaft and the front end of the output axis are not in direct contact, and in that the coupling between said rotation shaft of the valve and said output axis of the actuator is ensured by a coupling member placed between the front end of said output axis and the front end of said shaft, said coupling member having rotation torque transmission means with a misalignment tolerance between the output shaft on the one hand and the rotation shaft of the valve on the other hand, said valve being also characterized by thermally insulating mechanical link means between peripheral areas of the body of the actuator and the body of the valve.

The coupling between the ends of the two shafts is ensured by the cooperation between a first part of cross section fixed to the end of one of said shafts, without the form of the section being limiting, engaged in a transverse groove formed in a complementary second part fixed to the end of the other of said shafts. The first part and/or the second part are produced in a thermally insulating material. Their form and section can vary but the second part, linking the shaft bearing the blanking member, is advantageously of solid cross section, this section being inscribed in a diameter significantly greater (at least two times greater and typically three times greater) than that of the shaft bearing the blanking member, in order to form an effective thermal barrier to the hot gases that can return via the shaft bearing the blanking member.

"Inscribed section" should be understood to mean a section of any outer form, preferentially circular, having several points, preferentially all its points, tangential with the diameter in which it is inscribed. "Thermally insulating" should be understood to mean a thermal conductivity less than 30 $(W \cdot m^{-1} \cdot K^{-1})$. As a nonlimiting example, it will be possible to choose stainless steel (18% chrome, 8% nickel) or even ceramic.

According to a variant, the valve comprises at least one steel plate, or plate, placed between the front surface of the valve and the front surface of the actuator. Advantageously, it comprises at least two steel plates separated by an insulating blade, placed between the front surface of the valve and the front surface of the actuator. According to a first variant embodiment, said coupling member is produced in stainless steel. According to a second variant, said coupling member is produced in ceramic. According to a third variant, said coupling member is an Oldham joint.

Advantageously, the actuator has at least three peripheral link areas for fixing onto the valve. According to a preferential embodiment, said coupling member has a discal surface of deflection directed toward the front surface of the valve.

BRIEF DESCRIPTION OF THE DRAWINGS

The present invention will be better understood on reading the following description relating to a nonlimiting exemplary embodiment of a circulation valve according to the invention, referring to the attached drawings in which.

DETAILED DESCRIPTION

Figure 1:
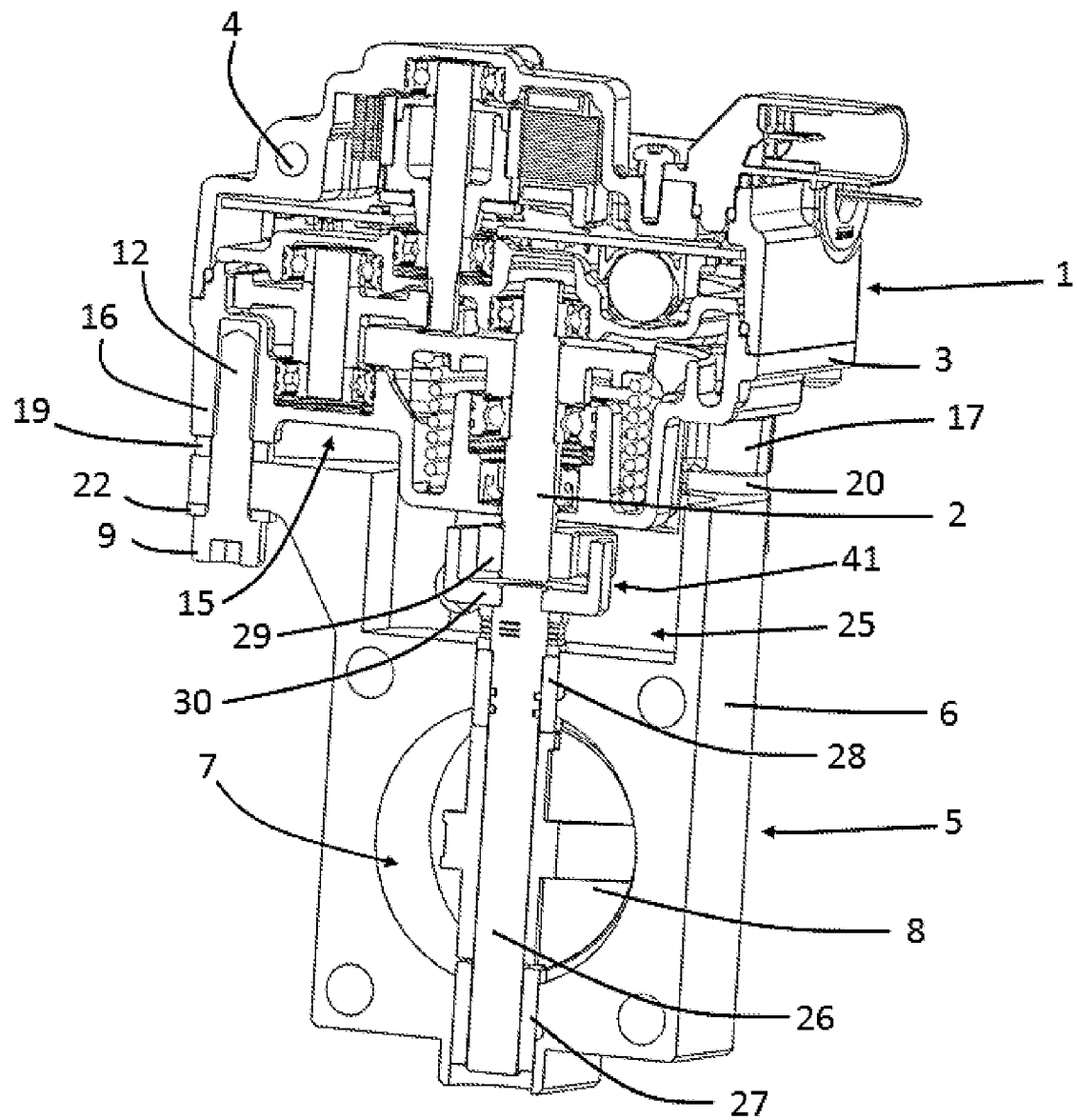
FIG. 1 represents a cross-sectional view of a first exemplary embodiment.
Figure 2:
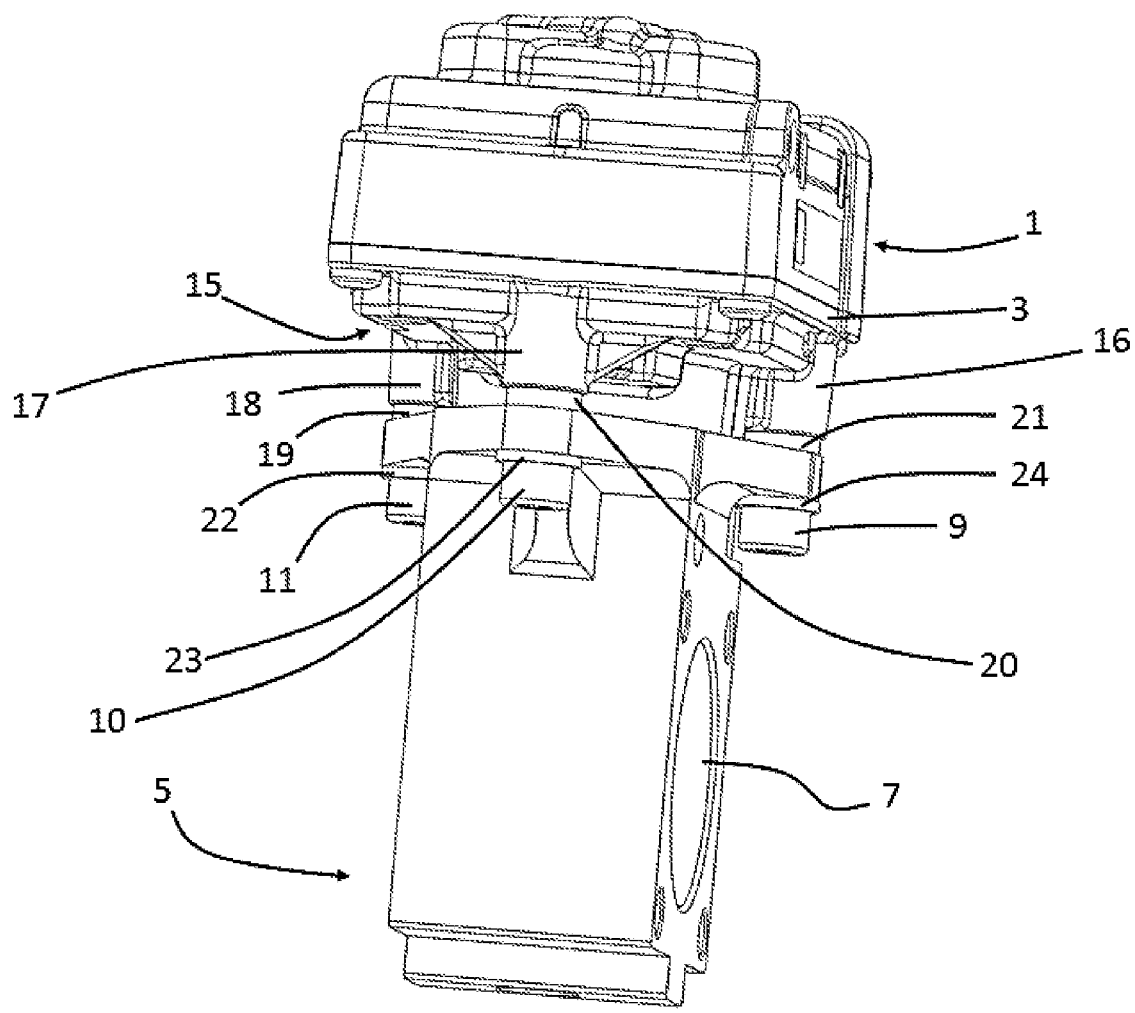
FIG. 2 represents a perspective view of the first exemplary embodiment.

The valve described with reference to FIGS. 1 and 2 comprises, as is known, an electromagnetic actuator (1) ensuring the angle of displacement of a metal shaft (2). In the example described, reprising an exemplary embodiment of an exhaust gas recirculation valve, the actuator (1) comprises a metal front body (3), for example made by aluminum casting or of an alloy ensuring a good thermal conduction. This front body (3) has cavities (4) for the circulation of a heat transfer fluid making it possible to ensure the cooling of the actuator.

The valve (5) comprises a metal valve body (6) defining an orifice (7) which can be blanked by a blanking member (8). This blanking member (8) is controlled in rotation by a drive shaft (26). This shaft (26) is guided by a front bearing (27) and a sealed rear bearing (28).

The mechanical link between the actuator (1) and the valve (5) is ensured by three screws (9, 10 and 11) engaging in threaded tappings (12 to 14) provided on the front body (3) of the actuator (1). The front surface (15) of the body of the actuator (1) has three annular protuberances (16 to 18) surrounding the mouth of the threaded tappings (12 to 14). These annular protuberances (12 to 14) make it possible to reduce the contact surfaces between the body (3) of the actuator (1) and the body of the valve (5) and therefore to reduce the thermal conduction.

To further reduce the thermal conduction between the body of the valve (5) and the body of the actuator (1), thermal insulation washers (19 to 21) are interposed between said annular protuberances (12 to 14) and the body of the valve (5). Similarly, thermal insulation washers (22 to 24) are interposed between the body of the valve (5) and the heads of the screws (9 to 11). These insulating washers are for example ceramic or epoxy glass or Bakelite washers, or even washers made of any other material of low thermal conductivity.

Figure 5:
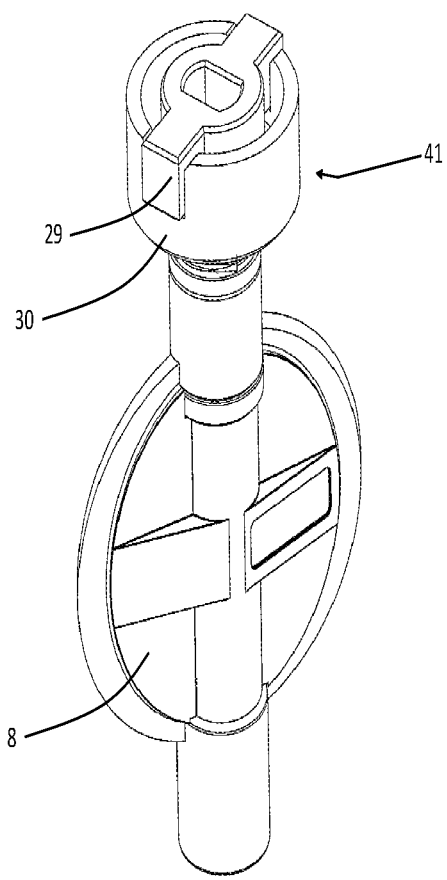
FIG. 5 represents an isolated view of the coupling member with the blanking member.

The rear part of the body (6) of the valve (5) has a cylindrical cavity (25) in which is housed a system (41) for coupling the shaft (2) of the actuator with the rotation shaft (26) of the blanking member (8) of the valve. The system (41) is also shown in FIG. 5. The shaft (2) of the actuator and the shaft (26) of the blanking member are aligned and coaxial. Their front ends are offset longitudinally to reserve an air gap limiting the thermal conduction between the two shafts (2, 26).

The coupling between the ends of the two shafts (2, 26) is ensured by the cooperation between a first part (29) fixed to the end of one of said shafts (2), engaged in a diametral groove formed in a complementary second part (30) fixed to the end of the other of said shafts. The first part (29) and/or the second part (30) are produced in a thermally insulating material. The second part (30) has a cup form whose bottom has a cross section inscribed in a diameter at least two times greater, and typically three times greater, than the diameter of the rotation shaft of the valve (26). The second part (30) has a transverse groove to allow the coupling of the first part (29).

The bottom of the second part (30) makes it possible to form a screen to the rise of hot gases toward the actuator. The cup form makes it possible to confer a compactness on the valve while limiting the transfer of hot gases and ensuring a good mechanical link. The coupling can also be produced by an Oldham joint, used in an unusual way for two axes that are virtually aligned and not greatly offset. This coupling method providing a part engaged in a complementary groove makes it possible to absorb low axial offsets between the two shafts (2, 26) and above all thermally insulate the two shafts (2, 26).

Figure 3A:
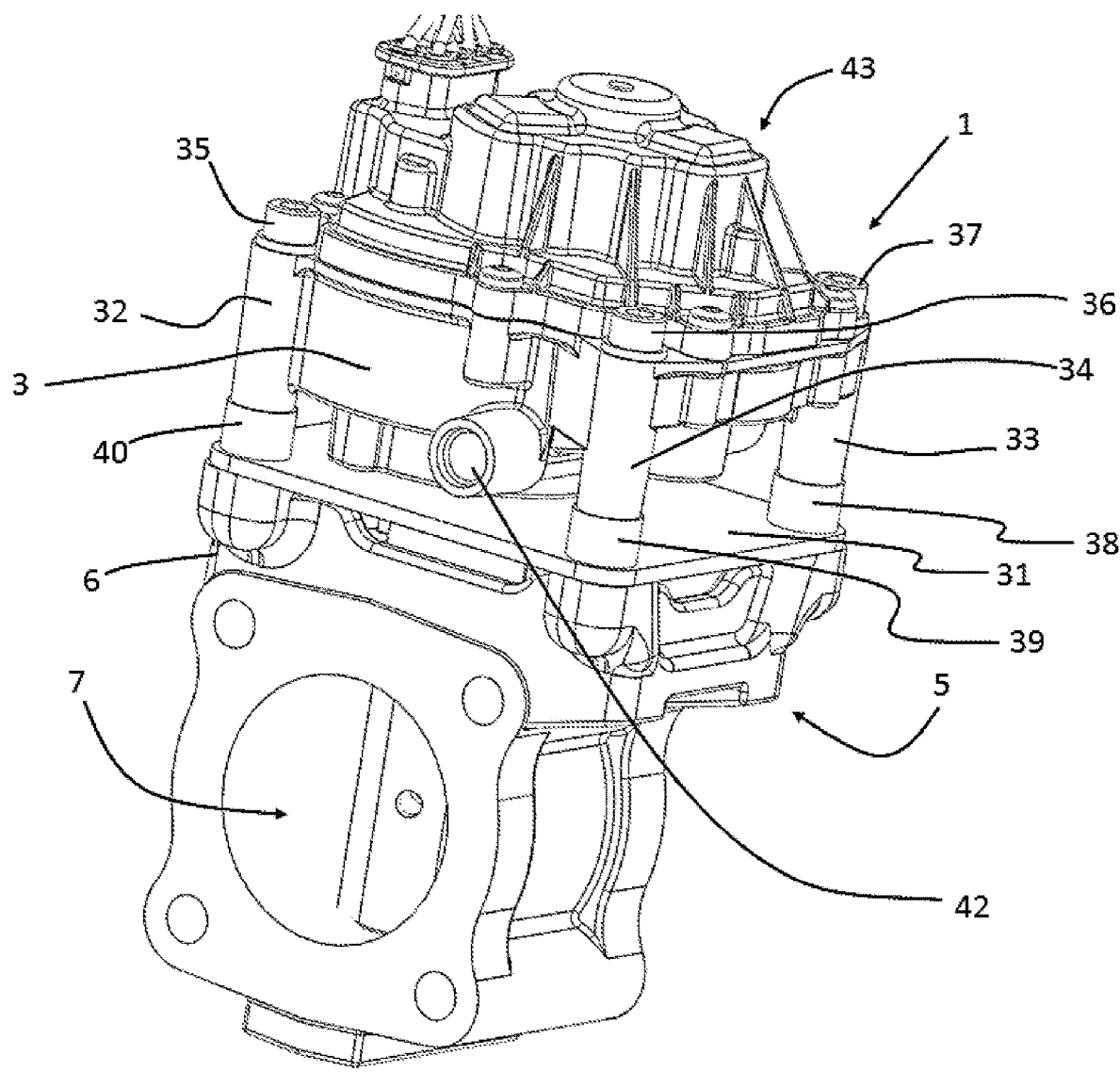
FIGS. 3a and 3b represent cross-sectional views of a second exemplary embodiment.
Figure 3B:
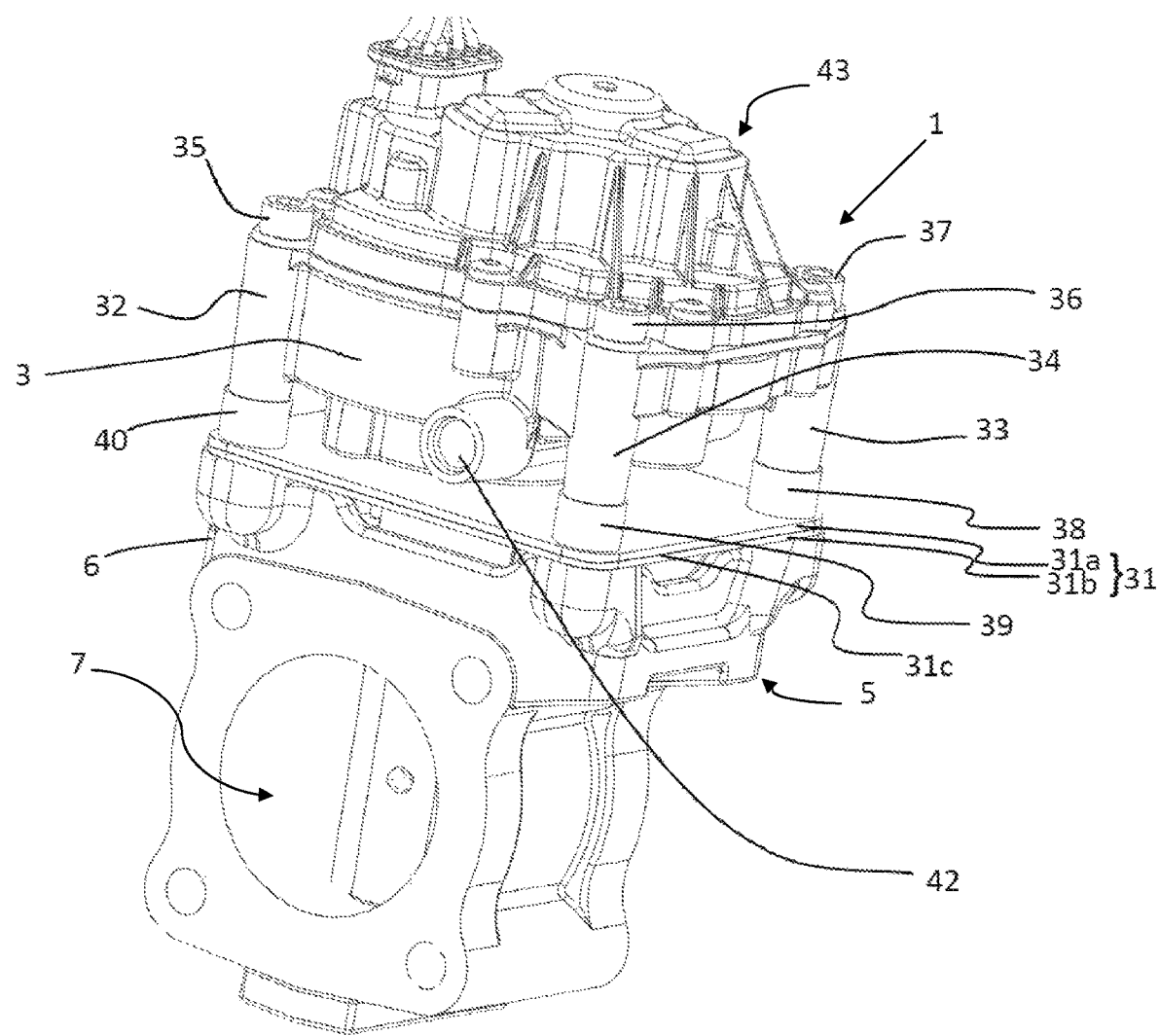

FIGS. 3a and 3b represent a variant embodiment that is distinguished by the presence of a plate (31) formed by a thin steel plate placed between the valve (5) and the actuator (1). The front body (3) of the actuator (1) has cylindrical columns (32 to 34) passed through by screws (35 to 37) ensuring the link with the body (6) of the valve (5). Thermally insulating spacers (38 to 40) are interposed between the end of the columns (32 to 34) and the steel plate (31).

In FIG. 3b, the steel plate (31) is made up of two metal sheets (31a, 31b) separated by an air blade (31c). It reflects the thermal radiation emitted by the valve (5). It is pierced with a hole for the passage of the shaft (2) of the actuator. It can be slightly dished to form a concave thermal shield, seen from the side of the valve (5).

In this exemplary embodiment, the actuator (1) comprises:
- a metal lower body (3), with a cooling circuit emerging from an end fitting (42), and
- an upper body (43) in a material of low thermal conductivity, for example a plastic material.

This upper body of low thermal conductivity makes it possible to limit the residual thermal transmission between the shaft (2) and the actuator, and in particular the electronic circuit with which the actuator is equipped.

Figure 4:
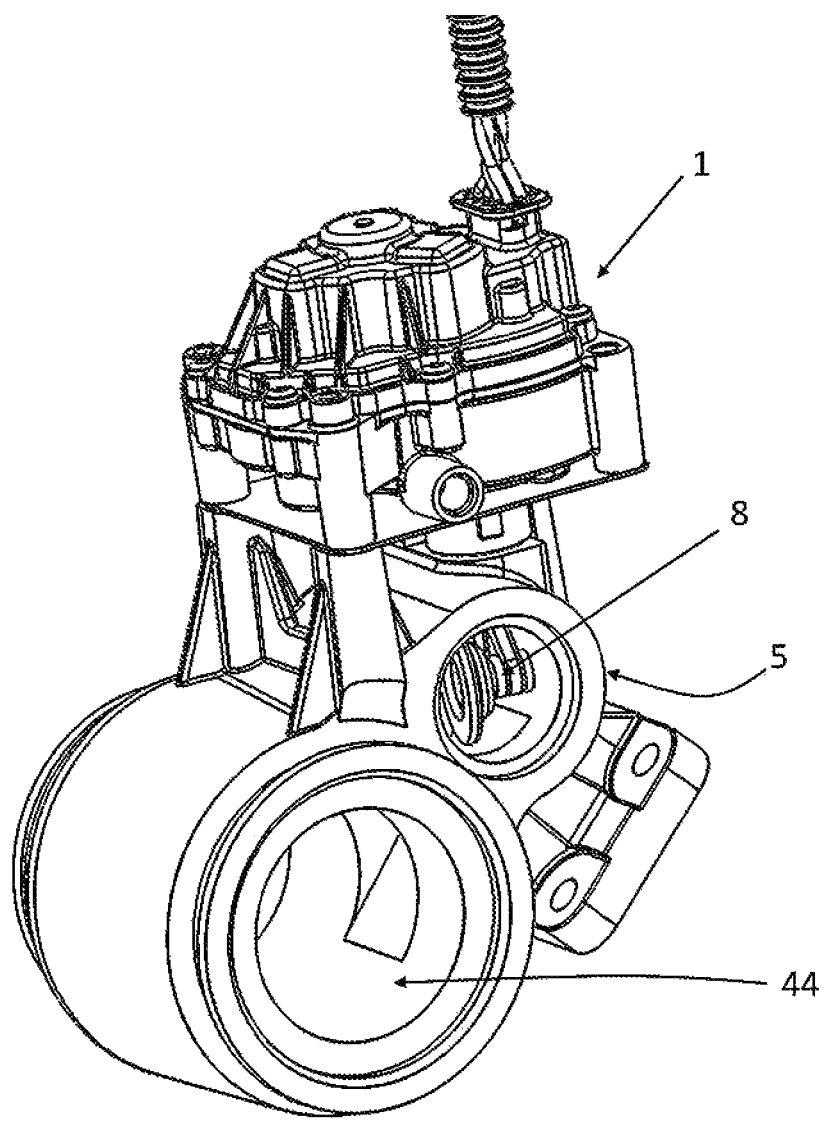
FIG. 4 represents a perspective view of a third exemplary embodiment.

FIG. 4 presents another embodiment specifically dedicated to a discharge valve of a main duct (44), also commonly called "waste gate". It also includes the constituent elements of the invention with, in particular, the actuator (1) which displaces a blanking member (8) in rotation, regulating the opening of the valve (5) serving as duct for diverting hot fluid from the main duct (44).

The invention claimed is:

1. An electrically-controlled valve for circulating hot fluids, the electrically-controlled valve comprising:
   an electromagnetic actuator;
   a valve having an orifice provided with a movable blanking member driven by a rotation shaft at right angles to an axis of the orifice;
   the electromagnetic actuator driving rotation of the rotation shaft, an output shaft of the actuator being substantially coaxial with the rotation shaft;
   a front end of the rotation shaft and a front end of the output shaft not being in direct contact;
   a coupling between the rotation shaft of the valve and the output shaft of the actuator is ensured by a coupling member placed between the front end of the output shaft and the front end of the rotation shaft;
   the coupling member having a rotation torque transmission with a misalignment tolerance between the output shaft on the one hand and the rotation shaft of the valve on the other hand;
   a thermally insulating mechanical link between peripheral areas of a body of the actuator and the body of the valve; and
   the coupling member including:
   (a) a first part fixed to the end of one of the shafts and including a body and at least one projection extending radially outwardly from the body, and
   (b) a second part fixed to the end of the other one of the shafts and including a bottom and a sidewall extending from and around a periphery of the bottom, the sidewall defining at least one slot that receives the at least one projection of the first part to couple the first part and the second part to each other, and
   the second part has a section inscribed in a diameter at least two times greater than that of the rotation shaft.

2. The electrically-controlled valve as claimed in claim 1, wherein at least one of the first part and the second part are of a thermally insulating material.

3. The electrically-controlled valve as claimed in claim 2, wherein the second part has a circular outer form.

4. The electrically-controlled valve as claimed in claim 1, wherein the coupling member is at least partly a material of low thermal conductivity.

5. The electrically-controlled valve as claimed in claim 1, further comprising at least one steel plate between a front surface of the valve and a front surface of the actuator.

6. The electrically-controlled valve as claimed in claim 5, wherein the at least one steel plate is made up of at least two metal sheets between the front surface of the valve and the front surface of the actuator.

7. The electrically-controlled valve as claimed in claim 1, wherein the coupling member is partly stainless steel.

8. The electrically-controlled valve as claimed in claim 1, wherein the coupling member is at least partly ceramic.

9. The electrically-controlled valve as claimed in claim 1, wherein the coupling member is an Oldham joint.

10. The electrically-controlled valve as claimed in claim 1, wherein the actuator has at least three peripheral link areas for fixing onto the valve.

11. The electrically-controlled valve as claimed in claim 1, wherein the said coupling member has a disc-shaped surface of deflection directed toward the front surface of the valve.

12. The electrically-controlled valve as claimed in claim 1, wherein the bottom includes an opening formed therein, the other one of the shafts extending at least partially through the opening.

13. The electrically-controlled valve as claimed in claim 1, wherein the second part is in the shape of a cup.

14. An electrically-controlled valve for circulating hot fluids, the electrically-controlled valve comprising:
   an electromagnetic actuator;
   a valve having an orifice provided with a movable blanking member driven by a rotation shaft at right angles to an axis of the orifice;
   the electromagnetic actuator driving rotation of the rotation shaft, an output shaft of the actuator being substantially coaxial with the rotation shaft; and
   a coupling member coupling the rotation shaft and the output shaft to each other, the coupling member including:
      (a) a first part fixed to an end of one of the shafts and including a body and a pair of projections extending radially outward from the body, and
      (b) a second part fixed to an end of the other one of the shafts and including a bottom and a sidewall extending from and around a periphery of the bottom, the bottom defining an opening that receives the end of the other one of the shafts, the sidewall defining a pair of slots that receive the pair of projections, and
   the second part has a section inscribed in a diameter at least two times greater than that of the rotation shaft.

15. The electrically-controlled valve as claimed in claim 14, wherein the body of the first part is cylindrically shaped and includes an opening extending therethrough, the one of the shafts extending through the opening.

16. The electrically-controlled valve as claimed in claim 15, wherein the pair of projections are diametrically opposed to each other and the pair of slots are diametrically opposed to each other.

17. An electrically-controlled valve for circulating hot fluids, the electrically-controlled valve comprising:
   an electromagnetic actuator;
   a valve having an orifice provided with a movable blanking member driven by a rotation shaft;
   the electromagnetic actuator driving rotation of the rotation shaft, an output shaft of the actuator being substantially coaxial with the rotation shaft; and
   a coupling member coupling the rotation shaft and the output shaft to each other, the coupling member including:
      (a) a first part fixed to an end of one of the shafts and including a body and at least one projection extending radially outward from the body, and
      (b) a second part fixed to an end of the other one of the shafts and including a bottom and a sidewall extending from and around a periphery of the bottom, the bottom and the sidewall cooperate to define a space that receives the first part and the end of the one of the shafts, the sidewall defining a slot that receives the at least one projection, and
   the second part has a section inscribed in a diameter at least two times greater than that of the rotation shaft.

18. The electrically-controlled valve as claimed in claim 17, wherein the first part and the end of the one of the shafts are spaced apart from the bottom of the second part.

19. The electrically-controlled valve as claimed in claim 17, wherein the second part is in the shape of a cup.

* * * * *